(12) United States Patent
Jacobson et al.

(10) Patent No.: US 6,571,964 B2
(45) Date of Patent: Jun. 3, 2003

(54) TRAY FOR RETAINING DISKS

(75) Inventors: Nathan Ellis Jacobson, Rochester, MN (US); Mark LeMarr Kyllo, Kasson, MN (US); Steven F. Starcke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/818,669

(22) Filed: Mar. 28, 2001

(65) Prior Publication Data

US 2002/0139763 A1 Oct. 3, 2002

(51) Int. Cl.[7] .............................................. A47G 19/08
(52) U.S. Cl. ................. 211/41.12; 118/500; 211/181.1; 211/41.18; 211/49.1
(58) Field of Search ................. 211/40, 41.12, 211/41.18, 41.1, 41.4, 184, 181.1, 42–43, 50–51, 133.5, 133.2, 90.01–901.03; 206/454, 832, 710–711, 564, 557; D32/55–59; 437/247, 946; D13/182; 414/935

(56) References Cited

U.S. PATENT DOCUMENTS

| | | | | |
|---|---|---|---|---|
| 465,070 A | * | 12/1891 | Trew .......................... 206/558 |
| 1,487,942 A | * | 3/1924 | Hines et al. ................ 211/41.3 |
| 1,952,457 A | * | 3/1934 | Painter ........................ 211/41.4 |
| 2,619,223 A | * | 11/1952 | Weioskopf .................. 206/449 |
| 3,610,613 A | * | 10/1971 | Worden ....................... 134/902 |
| 3,838,679 A | * | 10/1974 | Welch .......................... 126/541 |
| 3,889,815 A | * | 6/1975 | Merle .......................... 206/454 |
| 4,573,851 A | * | 3/1986 | Butler .......................... 206/832 |
| 4,653,636 A | * | 3/1987 | Armstrong .................. 118/500 |
| 4,676,008 A | * | 6/1987 | Armstrong .................. 206/454 |
| 4,742,922 A | * | 5/1988 | Demarest, Jr. .............. 211/175 |
| 4,872,554 A | * | 10/1989 | Quernemoen ............... 118/500 |
| 4,981,222 A | * | 1/1991 | Lee ............................. 118/500 |
| 4,993,559 A | * | 2/1991 | Cota ........................ 211/41.18 |
| 5,137,151 A | * | 8/1992 | Choate ........................ 206/370 |
| 5,174,045 A | * | 12/1992 | Thompson et al. ....... 210/360.1 |
| 5,307,941 A | * | 5/1994 | Siegal ........................... 211/11 |
| 5,332,105 A | * | 7/1994 | Stanfield ......................... 211/4 |
| 5,534,074 A | * | 7/1996 | Koons .......................... 118/500 |
| 5,607,065 A | * | 3/1997 | Todd ............................ 211/163 |
| D409,158 S | * | 5/1999 | Shimazu ...................... 206/832 |
| D418,646 S | * | 1/2000 | Hampshire .................. D32/55 |
| 6,033,215 A | * | 3/2000 | Ohsawa ..................... 211/41.18 |
| 6,065,615 A | * | 5/2000 | Uchiyama et al. .......... 118/500 |
| 6,092,851 A | * | 7/2000 | Korn et al. .................. 118/500 |
| 6,092,981 A | * | 7/2000 | Pfeiffer et al. .............. 206/710 |
| 6,099,302 A | * | 8/2000 | Hong et al. ............... 211/41.18 |
| 6,176,377 B1 | * | 1/2001 | Ali et al. ..................... 206/711 |
| D439,716 S | * | 3/2001 | Wright ......................... D32/55 |
| 6,234,328 B1 | * | 5/2001 | Mason ...................... 211/90.02 |

* cited by examiner

*Primary Examiner*—Daniel P. Stodola
*Assistant Examiner*—Jennifer E. Novosad
(74) *Attorney, Agent, or Firm*—Rabin & Berdo, PC; Robert H. Berdo, Jr.

(57) ABSTRACT

A tray for retaining disks includes first and second longitudinally extending, spaced apart, parallel rods. A plurality of support plates are directly attached to the rods. Each support plate has at least one notch formed therein for receiving a respective support member. A plurality of rails are attached to the support plates. At least three spaced apart wires are provided. Each wire is formed to have a zigzag configuration adapted to receive and support the disk at an outer peripheral edge thereof. One of the wires is disposed to contact the outer periphery of the disk at a position of zero degrees, another one of the wires is disposed to contact the outer periphery of the disk at a position less than 90 degrees, and a further one of the wires is disposed to contact the outer periphery of the disk at a position greater than 270 degrees.

38 Claims, 4 Drawing Sheets

TRAY FOR RETAINING DISKS

BACKGROUND OF THE INVENTION

1. Field of the Invention

The invention relates to a tray for retaining disks, such as glass disks used in storage devices, during processing of the disks.

2. Background Information

Circular-shaped magnetic disks are typically used in hard disk drives of computers, for example, for use in data storage applications. Such magnetic disks may be formed from aluminum, or from glass, for example, and will typically have a magnetic surface coating located thereon. A head of the disk drive interacts with the magnetic surface coating to read and write information to the disk. Such magnetic disks have achieved storage capacities of several gigabytes or more, using current technology.

Typically, the head of the disk drive that reads and writes information to the disk is arranged to float a small distance above a surface of the disk. By bringing the head closer to the surface of the disk, higher density recording becomes possible.

As mentioned, often the magnetic disks are formed from aluminum. However, aluminum is relatively soft, so when it is handled, it is possible to ding the disk and form an area where data cannot be retrieved from. Further, the aluminum is typically coated with a nickel plating to give the disk more stiffness and a harder surface. However, the nickel plating has a tendency to become magnetic, causing errors in reading and writing to the disk. Additionally, aluminum disks are limited in how smooth their surfaces can be made. The smoother a magnetic disk can be made, the closer the head can be brought to the surface of the disk during the read/write operations.

To overcome the problems associated with aluminum disks, attention has been directed to the utilization of glass disks, formed from sodium lithium glass, for example. However, the disk is typically spun at speeds of 7,000 to 10,000 revolutions per minute and higher. Since the disk is typically accelerated rapidly to, and decelerated rapidly from these speeds, the conventional glass disk is subject to breakage due to the stresses generated during spin-up and slow-down of the disk.

Further, glass disks are subject to breakage simply due to the fragile and brittle nature of glass. That is, if the glass disk is subjected to a shock, it may shatter and break.

Thus, there is a need for a glass disk that has increased strength and shock resistance, to reduce breakage to the disk.

Further, glass disks are prone to developing surface cracks. These surface cracks can spread, eventually weakening the disk sufficiently to cause it to fail. Thus, there is a need for a glass disk that stops or prevents surface crack propagation.

It is also known to strengthen glass (such as so-called bullet proof glass), using for example, chemical strengthening processes. However, the strengthening of glass disks used in data storage applications is problematic, in that handling or securing of the disks during treatment can cause minute defects on the surface of the glass disk, leading to the occurrence of read/write errors when using such disk.

Therefore, there is a need for a way of strengthening glass disks that will not damage or harm the glass disks during the process.

Furthermore, there is a demand for an inexpensive glass disk that can be manufactured in large quantities. Thus, there is a need for a way of simultaneously strengthening a large number of glass disks. Moreover, there is a need for a glass disk strengthening process that is adapted to be performed using automation.

SUMMARY OF THE INVENTION

It is, therefore, a principle object of this invention to provide a tray for retaining disks.

It is another object of the invention to provide a tray for retaining disks that solves the above mentioned problems.

These and other objects of the present invention are accomplished by the tray for retaining disks disclosed herein.

In an exemplary aspect of the invention, a tray is used to secure glass disks in a chemical strengthening process. The glass disks are chemically strengthened to make the disks stronger and stiffer, which minimizes the amount of flutter as the disks are spun in use.

In order to prevent a defect at a point of contact between the tray and the disk, in a further exemplary aspect of the invention, the disk and tray have similar thermal characteristics. That is, if the disk and tray had significantly different thermal characteristics, upon removing the tray and the disks from the bath, the disks would cool much more rapidly than the tray. Thus, heat from the tray could concentrate at the points of contact between the tray and the disks, causing defects at the points of contact. Providing the tray with similar thermal characteristics to the disk advantageously prevents defects at the points of contact, for example, on the periphery of the disk.

In another exemplary aspect of the invention, the tray is entirely formed of titanium, since titanium has thermal characteristics (i.e., coefficient of thermal expansion and thermal conductivity) very similar to the glass of the disks. Although the thermal characteristics are not identical, titanium can advantageously be tailored to have a desired configuration, will withstand the prolonged heat of the salt bath, and is more similar in its thermal characteristics to the glass disk than other potential materials for the trays, such as stainless steel. By matching the thermal characteristics of the glass, the glass disk and the tray will expand and contract in a similar manner, and will heat up and cool down at a similar rate.

In a further aspect of the invention, the tray includes one or more longitudinally extending solid rods disposed at a bottom, for example, of the tray. The solid rods will advantageously provide the tray with the desired strength and rigidity.

In another exemplary aspect of the invention, the tray includes at least one support plate that connects the rods together. For example, the tray may include four equally spaced, parallel support plates. By providing four support plates, the support plates can be located without interfering with the placement of the glass disks from the process cassettes (i.e., cassettes used to transport the disks during other procedures). That is, with a tray that is adapted to accommodate the glass disks from three process cassettes, the intermediate support plates can be located at junctions defined by adjacent process cassettes.

In another exemplary aspect of the invention, each support plate has the rods attached to a bottom thereof, for example. Further, each support plate has a notch formed therein, and at a location above the rods. The notches allow the trays to be slid over support members attached to a panel, to facilitate the automation of the chemical strengthening process.

In yet another aspect of the invention, the tray includes one or more disk-supporting members attached to the support plates, for example. The disk-supporting members are disposed to contact the outer peripheral edge of the respective glass disks in an engaging manner, to hold the disks upright (on their edges) during the chemical strengthening procedure.

Further, in order to ensure that the glass disks cool at about the same rate as the points of contacts of the tray, in a further exemplary aspect of the invention, the disk supporting members are wires tailored to have a zigzag (i.e., saw tooth) shape. Thus, each wire has a plurality of teeth, and a plurality of valleys disposed between adjacent teeth. In use, an outer peripheral edge of the glass disk is disposed in a respective valley, to help secure the glass disk to the tray.

In an exemplary aspect of the invention, the wires are relatively thick, and have a rectangular cross-sectional profile, although other cross-sectional profiles are also within the scope of the invention. For example, the wires may have a cross-sectional dimension of about 0.5 to 1.5 millimeters by about 0.5 to 1.5 millimeters. By being relatively thick, the wires are provided with sufficient rigidity and strength to support the various glass disks.

Moreover, in another aspect of the invention, the wires are open at all sides. Thus, the wires will tend to cool at about the same rate as the glass disks, thereby preventing the occurrence of hot spots. As a result, glass disks can be formed having superior characteristics.

In an exemplary aspect of the invention, there are three spaced apart zigzag wires, each being in contact with an outer periphery of the glass disk. The use of three wires helps to ensure that the glass disk will be retained in an upright position without tipping over. One of the wires is arranged between the support rods, so as to contact the disk at a lowermost peripheral portion thereof, at 0 degrees. The other two wires are disposed on opposite sides of the lowermost wire, to contact the outermost peripheral edge of the glass disk at an intermediate position, such as a position greater than 0 degrees and less than 90 degrees relative to the lowermost wire, for example. In an exemplary aspect of the present invention, the other two wires are arranged to contact the outer periphery of the glass disk offset to the lowermost wire by between about 70 and 80 degrees. Thus, and moving clockwise, if the lowermost wire is at 0 degrees on the circumference of the glass disk, the next wire will be disposed between about 70 and 80 degrees, and the next wire will be disposed between about 280 and 290 degrees. This configuration ensures that the wires contact the edges of the glass disk below a center line of the disk (i.e., a line passing through the 3:00 and 9:00, or 90 degree and 270 degree positions of the disk). That is, if the wires contacted the glass disk at or above the center line, the forces generated from the expanding and contracting components could forcibly push the disk down into the lowermost wire, causing possible deformities in, or breakage of the disk. By arranging the wires in the described manner, the forces will tend to push the disk upward, thus preventing the accumulation of undesirable stresses.

Further, if a plurality of wires are provided, the wires may be arranged so that the teeth and valleys of the respective wires are in registration with each other. This will allow the glass disks to be held in an essentially upright position, when placed in the correct valleys.

Further, in another exemplary aspect of the invention, each wire is zigzagged so that the teeth lie within a plane that projects through a center of the disks. That is, each tooth of the wire is arranged to point toward a center of the respective disks. This configuration ensures that the outer peripheral edge of the disk will not become hung up or caught in the teeth.

In an exemplary aspect of the invention, the radius of the valleys in the saw tooth pattern of the wire is selected so that the wire does not "pinch" the edges of the disk as the tray and the disk are heated and cooled. This ensures that the glass disk will not become stuck within the valleys of the wires during the expansion and contraction of the various components.

Moreover, in another aspect of the invention, the teeth are arranged to provide the valleys with a V-shaped configuration. This arrangement helps guide or channel the glass disks into position toward a base of the valleys. Moreover, since the sides of the teeth project outward away from the valley, this configuration ensures that the sides of the teeth do not come into contact with the surfaces of the glass disks.

In another aspect of the invention, the teeth of the wires are arranged with a spacing similar to the process cassettes, for example, a quarter inch spacing. Thus, the tray can easily accommodate three, for example, process cassettes of glass disks arranged end to end. Therefore, in an automated process, a mandrel can be used to move the process cassettes into and out of engagement with the tray, with a minimum of human intervention.

In yet a further aspect of the invention, the wires are attached to the support plates using rails that extend parallel to the wires. The rails provide added support to the wires, without significantly increasing the heat retention of the wires. Further, the wires may be connected to the rails using spaced connecting wires, each of which extends from the respective wire to the respective rail. The connecting wires help to keep the wires separated from the rails, maintaining the open framework of the wires.

In another aspect of the invention, the rails may be tipped up so that they are perpendicular to the edge of the disk. This helps ensure that the teeth of the wires point directly toward the center of the disk, ensuring that the disk does not get jammed or caught in the wires. That is, as the components expand and contract, the disk can move up and down.

In an exemplary aspect of the invention, the various parts of the tray are cut to shape using a laser. Thus, for example, a rail and a respective wire can be cut from a single plate of material. This results in a structure that is relatively strong, and eliminates any need to fasten the wires to the rails using other means, such as welding. Moreover, cutting the undulating shape of the wires using a laser prevents the occurrence of bending stresses that may accumulate at the bends of the wires, which may otherwise cause the wires to break.

In an exemplary aspect of the invention, the panel is adapted to accommodate an array of 8 columns by 10 rows of trays. Moreover, a like number of trays can be accommodated on an opposite side of the panel. Thus, in a relatively small volume of space, for example, 40 cubic feet, and with a tray adapted to accommodate 75 glass disks, a fully loaded panel can treat up to 12,000 glass disks simultaneously.

Due to the configuration of the trays, the locating of the disks into the tray, and the sliding of the trays onto the panel, the chemical strengthening process, the placement of the glass disks into the tray, and the removing of the glass disks from the tray can be performed automatically.

DETAILED DESCRIPTION OF THE PREFERRED EMBODIMENTS

Figure 1:
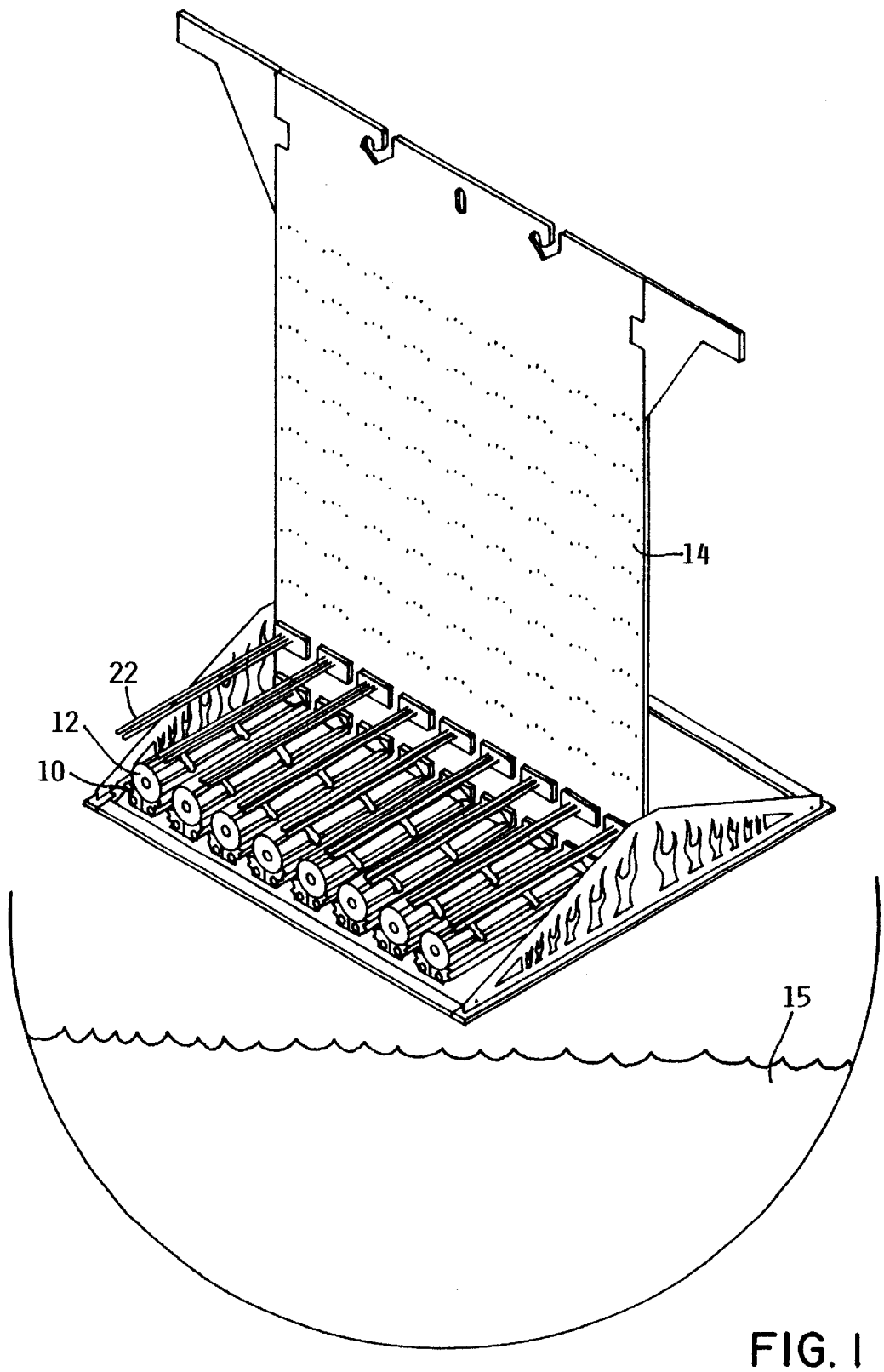
FIG. 1 is a perspective view of a tray holding a disk, and being disposed on a panel, prior to a chemical strengthening procedure.

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper", "lower", "front", "back", "over", "under", and similar such terms are not to be construed as limiting the invention to a particular orientation. Instead, these terms are used only on a relative basis.

The present invention is directed toward a tray 10 that may be used to secure glass disks 12 during a chemical strengthening process. The glass disks 12 are chemically strengthened to make the disks stronger, shock resistant and stiffer. Since the disks are typically spun at speeds of 7,000 to 10,000 revolutions per minute and higher, without the chemical strengthening, the disks could shatter and break during spin-up and slow-down of the disks.

Further, chemical strengthening increases the shock resistance of the disks, preventing accidental breakage due to dropping the disks, for example. Further, chemical strengthening reduces surface crack propagation in the disk.

The disks typically are standardized in diameter. For example, the current conventional disks have one of a diameter of 65, 70, 84, or 95 millimeters, for example. Further, the disks typically have a concentric hole having a diameter, for example, of about 25 millimeters, which receives a rotatable shaft of a disk drive (not shown), for rotating the disk. The concepts of the present invention are applicable to disks of any diameter, configuration or thickness.

The glass disks may be purchased in a condition that requires further treatment in addition to the chemical strengthening process. For example, it may be desired that the finished product be transparent. However, at the beginning of the process, the glass disks may be delivered by the manufacturer in an almost opaque condition, to have a somewhat cloudy appearance.

In order to prepare the glass disks for use, the glass disks may be subjected to a first step polish, then an ultrasonic cleaning, then a second step cleaning, then another ultrasonic cleaning. Thereafter, the glass disks may then be placed in a stream cleaner, which includes a series of scrub tanks to clean off any slurry from the disks used in the polishing process. Next, the disks may be subjected to the chemical strengthening process. Thereafter, the glass disks may be placed into a wet tank where the disks are kept wet until being fed into another stream cleaner. This may be followed by subjecting the glass disks to a series of acid bath scrubs.

The glass disks may be transported in the aforementioned processes, with the exception of the chemical strengthening process, using process cassettes (not shown), each of which holds 25 glass disks, for example. The process cassettes have the disks arranged therein at a predetermined spacing, for example, a quarter inch spacing.

Referring to FIG. 1, the chemical strengthening process begins with, for example, clean disks 12 that are loaded into tray 10. A number of the trays 10 may be mounted to a panel 14 that is then lowered into a heated salt bath 15. With a glass disk 12 that is formed from sodium lithium glass, for example, the salt bath may be, for example, a potassium nitrate bath heated to a temperature of about 380° C., for example.

The glass disks 12 and trays 10 are immersed in the salt bath for about 4 hours, for instance. During this time, potassium ions of the salt bath are exchanged with lithium ions in the glass. Since the potassium ions are larger than the lithium ions, when the glass disk 12 cools, a larger ion (the potassium ion) will then be in the space of a smaller ion (the lithium ion), giving the glass disk 12 added hardness and strength. The ion exchange process of the chemical strengthening procedure can increase the strength of the glass by a factor of about three, for example.

In an exemplary aspect, the salt bath 15 is disposed within a 2,000 gallon stainless steel tank (not shown) that includes immersion heaters for heating the salt bath, stirrers for circulating the salt bath, a recirculating filter, and a pre-heat/cool-down hood over a top of the tank.

In an exemplary aspect of the invention, and in order to prevent a defect at a point of contact between the tray 10 and the disk 12, the disk and tray may have similar thermal characteristics. That is, if the tray and disk had significantly different thermal characteristics, upon removing the tray and the disks from the bath, the disks would cool much more rapidly than the tray. Thus, heat from the tray would concentrate at the points of contact between the tray and the disks, causing defects at the points of contact.

Thus, in an exemplary aspect of the invention, the tray 10 is formed partially or entirely of titanium, since titanium has thermal characteristics (i.e., coefficient of thermal expansion and thermal conductivity) very similar to sodium lithium glass. Although the thermal characteristics are not identical, titanium can be tailored to have a desired configuration, will withstand the prolonged heat of the salt bath, and is more similar in its thermal characteristics to the glass disk 12 than other potential materials for the trays 10, such as stainless steel.

However, if a different type of glass or material is used for the disk 12, it may be desirable to utilize a titanium alloy or other material, such as a steel or steel alloy, having similar thermal characteristics to the material of the disk. By matching the thermal characteristics of the tray with the material of the disk 12, the disk and the tray 10 will expand and contract in a similar manner, and will heat up and cool down at a similar rate.

In another aspect of the invention, the tray 10 has sufficient rigidity and strength to support a plurality of glass disks 12. Further, since the glass disks 12 are conventionally transported in process cassettes, each of which holds 25 disks, for example, the tray 10 may be adapted to accommodate the disks of one or more process cassettes, for example three process cassettes, for a total of 25 disks, 50 disks, 75 disks, and so on, for example.

Figure 2:
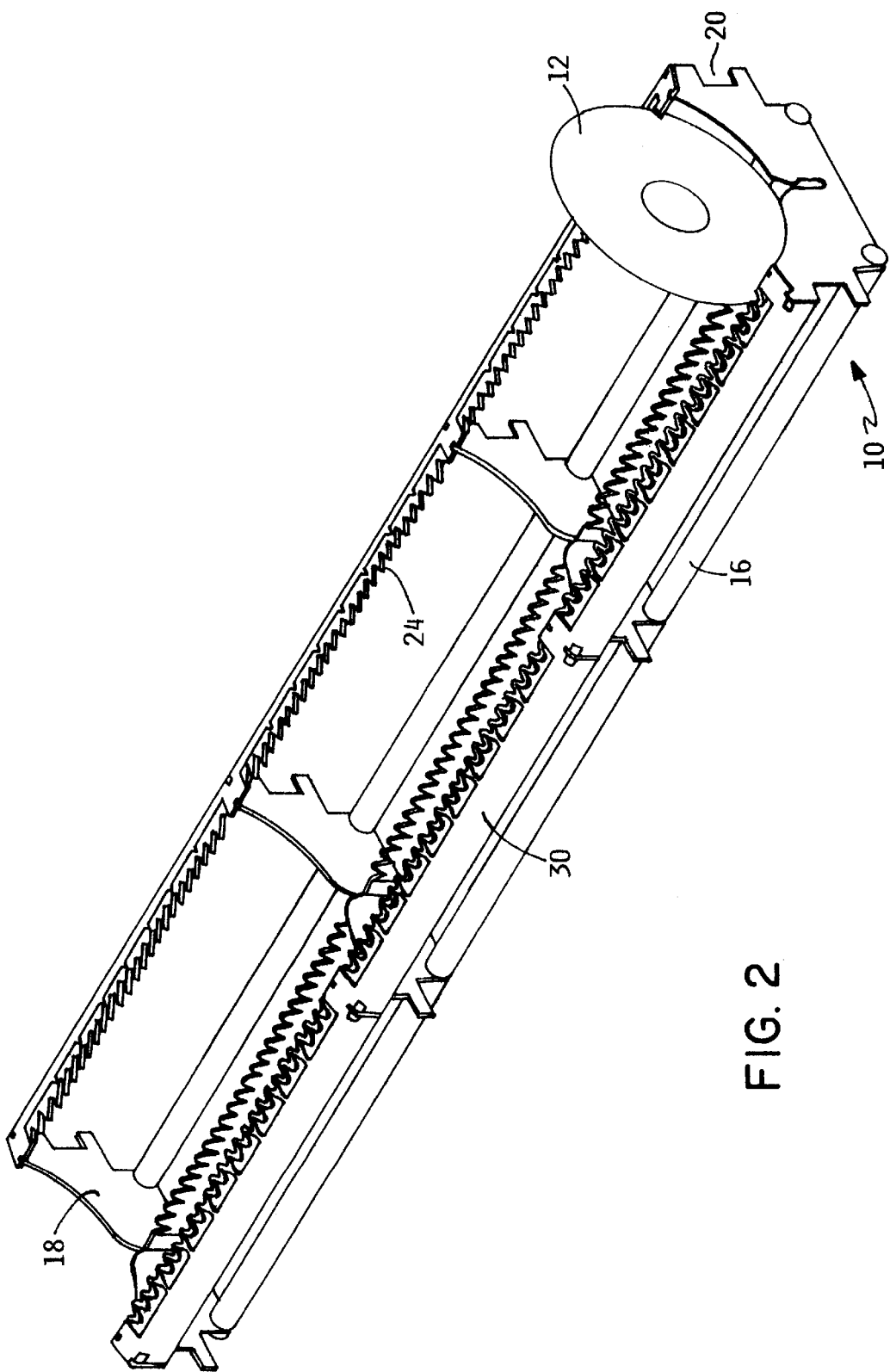
FIG. 2 is a perspective view of the tray shown in FIG. 1.
Figure 3:
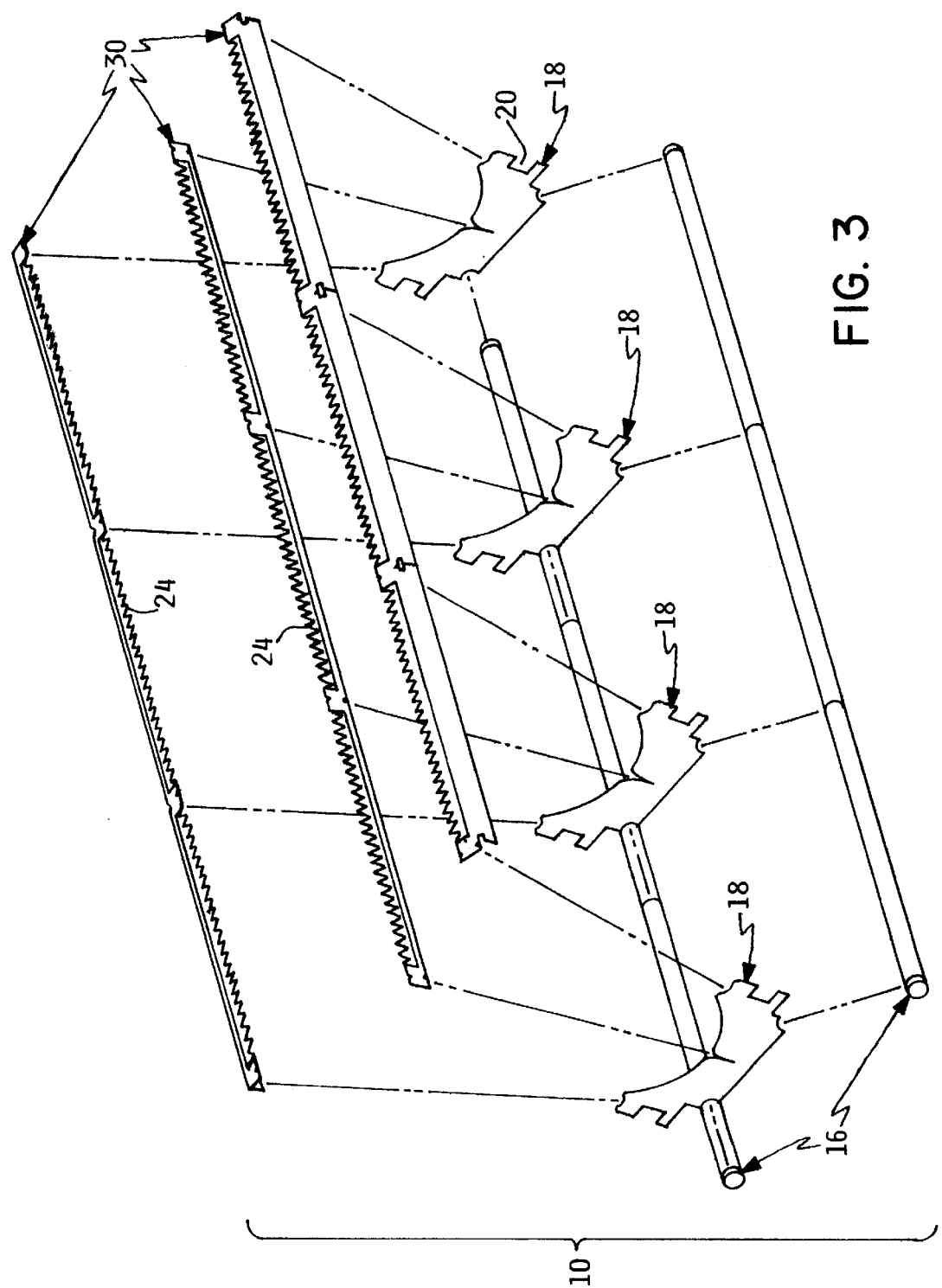
FIG. 3 is an exploded view of the tray shown in FIG. 1.

Referring also to FIGS. 2 and 3, to provide the rigidity, the tray 10 may include one or more longitudinally extending solid rods 16 disposed at a bottom, for example, of the tray 10. In the exemplary illustrated aspect of the invention, the tray includes two solid rods 16 arranged in a spaced apart and parallel relationship. Of course, more or fewer rods 16 could be provided without departing from the spirit of the invention.

Further, although the rods 16 are shown as having a cylindrical shape, the shape of the rods can be tailored to deviate from this aspect of the invention. For example, the rods 16 can have any of a variety of outer peripheral configurations. Moreover, instead of being solid, the rods may be tubular-shaped. However, it is currently believed that a solid rod will provide the tray 10 with the desired strength and rigidity.

In order to connect the rods 16 together, each tray 10 includes at least one support plate 18. Further, although the number of support plates 18 can be modified without departing from the scope of the invention, it is further believed to be desirable to have a support plate 18 disposed at each end of the tray 10.

In the exemplary illustrated aspect of the invention, the tray 10 includes four equally spaced, parallel support plates 18, that is, a support plate disposed at each end of the tray, and two support plates disposed between the ends of the tray. By providing four support plates 18, the support plates can be located without interfering with the placement of the glass disks 12 from the process cassettes. That is, with a tray 10 that is adapted to accommodate the glass disks 12 from three process cassettes, the intermediate support plates 18 can be located at junctions defined by adjacent process cassettes.

In the exemplary illustrated aspect of the invention, each support plate 18 has the rods 16 attached to a bottom thereof, for example. Further, each support plate 18 has a notch 20 formed therein, and at a location above the rods 16. The notches 20 allow the trays 10 to be slid over support members 22 which are attached to panel 14 (see FIG. 1). This facilitates the automation of the chemical strengthening process, as will be more fully described in the paragraphs that follow.

It is contemplated that instead of notches 20, the support plates 18 can be formed with holes to accommodate the support members 22. Further, the exact placement of the notches 20 or holes can be modified without departing from the spirit of the invention.

The tray 10 further includes a plurality of longitudinally extending disk-supporting members attached to the support plates 18. The disk-supporting members are disposed to contact the outer peripheral edge of the respective glass disks 12 in an engaging manner, to hold the disks upright (on their edges) during the chemical strengthening procedure.

Figure 4:
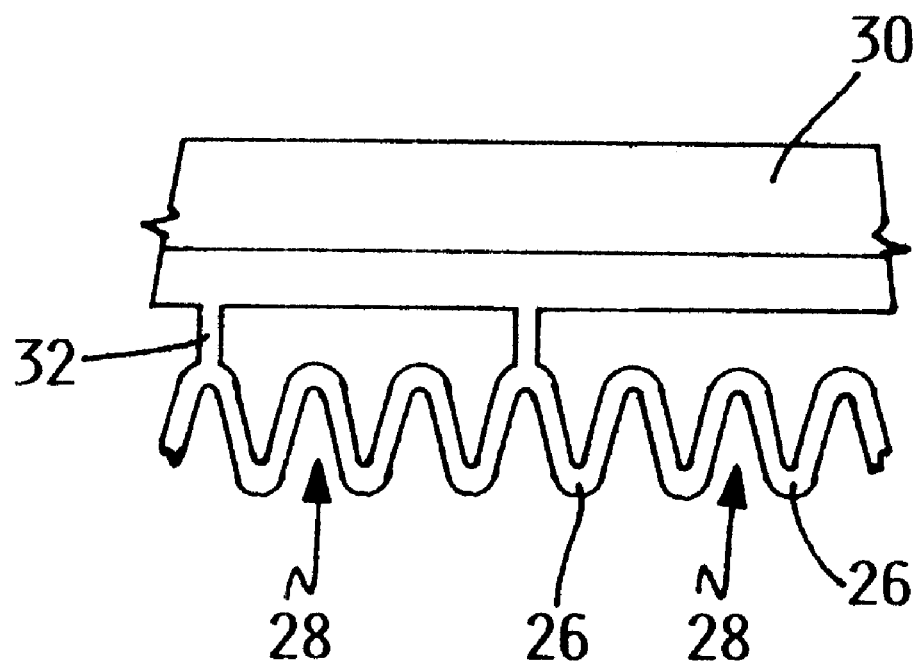
FIG. 4 is a sectional view of a wire and a rail of the tray shown in FIG. 1.

The solid rods 16, due to their mass, retain their heat for a substantial period of time after the tray 10 and disks 12 are removed from the salt bath. Thus, the glass disks 12 cool more rapidly than the solid rods 16 of the tray 10. In order to ensure that the glass disks 12 cool at about the same rate as the points of contacts of the tray 10, in the illustrated exemplary aspect of the invention, the disk-supporting members are wires 24 tailored to have a dual-sided zigzag (i.e., saw tooth) shape (i.e., the sawtooth configuration extends on opposite longitudinal sides of the wires). Thus, and referring also to FIG. 4, each wire has a plurality of teeth 26, and a plurality of valleys 28 disposed between adjacent teeth 26. In use, an outer peripheral edge of the glass disk 12 is disposed in a respective valley, to help secure the glass disk to the tray 10.

In an exemplary aspect of the invention, the wires 24 are relatively thick, and have a rectangular cross-sectional profile, although other cross-sectional profiles are also within the scope of the invention. For example, the wires 24 may have a cross-sectional dimension of about 0.5 to 1.5 millimeters by about 0.5 to 1.5 millimeters. By being relatively thick, the wires 24 are provided with sufficient rigidity to support the various glass disks 12. However, in the exemplary illustrated aspect of the invention, the wires 24 are not so thick as to serve as heat sinks which would retain heat for a significantly longer period of time than the glass disks they are supporting.

It is also contemplated that a solid plate (not shown, but a member having a width that is substantially greater than its thickness) having a number of v-notches formed therein for supporting the disk 12 may be used instead of, or in addition to the wires 24. However, the use of such a solid plate may be disadvantageous, in that the solid plate, due to its mass and configuration, would likely absorb and retain the heat from the solid rods 16, this causing the solid plat to cool much more slowly that the glass disks 12. Therefore, so-called hot spots may be formed at the points of contact with the glass disks 12. These hot spots can cause defects in the glass disks 12 leading to the occurrence of read/write errors when using the disk. In contrast, since the wires 24 are open at all sides (i.e., have a dual-sided sawtooth configuration), the wires will tend to cool at about the same rate as the glass disks 12, thus preventing the occurrence of hot spots, and thereby providing glass disks with superior characteristics.

In the illustrated exemplary aspect of the invention, there are three spaced apart zigzag wires 24, each being in contact with an outer periphery of the glass disk 12. The use of three wires 24 helps to ensure that the glass disk 12 will be retained in an upright position without tipping over.

In the illustrated aspect of the invention, one of the illustrated wires 24 is arranged between the support rods 16, so as to contact the disk 12 at a lowermost peripheral portion thereof, at 0 degrees. The other two illustrated wires 24 are shown disposed on opposite sides of the lowermost wire, to contact the outermost peripheral edge of the glass disk 12 at intermediate positions, such as positions greater than 0 degrees and less than 90 degrees relative to the lowermost wire, for example.

For example, the other two wires 24 may be arranged to contact the outer periphery of the glass disk 12 offset to the lowermost wire by between 70 and 80 degrees. Thus, and moving clockwise, if the lowermost wire is at 0 degrees on the circumference of the glass disk 12, the next wire will be disposed between about 70 and 80 degrees, and the next wire will be disposed between about 280 and 290 degrees. This configuration ensures that the wires 24 contact the edges of the glass disk 12 below a center line of the disk 12 (i.e., a line passing through the 3:00 and 9:00, or 90 degree and 270 degree positions of the disk). That is, if the wires 24 contacted the glass disk 12 at or above the center line, the forces generated from the expanding and contracting components could forcibly push the disk 12 down into the lowermost wire, causing possible deformities in, or breakage of the disk 12. By arranging the wires 24 in the described manner, the forces will tend to push the disk 12 upward, thus preventing the accumulation of undesirable stresses.

Further, if a plurality of wires 24 are provided, it may be desirable to arrange the wires so that the teeth 26 and valleys 28 of the respective wires are in registration with each other. This will allow the glass disk 12 to be held in an essentially upright position, when placed in the aligned valleys 28.

Further, in another exemplary aspect of the invention, each wire is zigzagged so that the teeth 26 lie within a plane that projects through a center of the disk 12. That is, each tooth of the wire is arranged to point toward a center of the disk 12. This configuration ensures that the outer peripheral edge of the disk 12 will not become hung up or caught in the teeth 26.

In an exemplary aspect of the invention, the radius of the valleys 28 is selected so that the wire does not "pinch" the edges of the disk 12 as the tray 10 and the disk are heated and cooled. This ensures that the glass disk 12 will not become stuck within the valleys 28 of the wires 24 during the expanding and contraction of the various components. For example, with a disk thickness of about 0.33 millimeters, the radius of curvature of the valleys 28 may be greater than 0.165 millimeters, for example, 0.17 millimeters to about 0.20 millimeters or greater. This dimension could be modified with disks 12 of different thicknesses.

Moreover, as shown, the teeth 26 are arranged to provide the valleys 28 with a V-shaped configuration. This arrangement helps guide or channel the glass disk 12 into position toward a base of the valleys 28. Moreover, since the sides of the teeth 26 project outward away from a base of the valley, this configuration ensures that the sides of the teeth 26 do not come into contact with the surfaces of the glass disks 12.

As previously discussed, the process cassettes (not shown) have the disks arranged therein at a predetermined spacing, for example, a quarter inch spacing (i.e., a pitch of a quarter inch). Similarly, the teeth 26 of the wires 24 are arranged in a like spacing, for example, a quarter inch spacing or pitch. Thus, the tray 10 can easily accommodate three, for example, process cassettes of glass disks 12 arranged end to end. Therefore, in an automated process, a mandrel (not shown) can be used to move the process cassettes into and out of engagement with the tray 10, with a minimum of human intervention.

In another aspect of the invention, the wires 24 may be attached to the support plates 18 using rails 30 that extend parallel to the wires 24. The rails 30 provide added support to the wires 24, without significantly increasing the heat retention of the wires 24. The wires 24 may be connected to the rails 30 using spaced connecting wires 32, each of which extends from the respective wire to the respective rail. By way of example, a connecting wire 32 can be located between every third and fourth tooth, at a respective valley. The connecting wires 32 help to keep the wires 24 separated from the rails 30, maintaining the open framework of the wires 24.

The rails 30 may be tipped up so that they are perpendicular to the edge of the disk 12. This helps ensure that the teeth 26 of the wires 24 point directly toward the center of the disk 12, as previously discussed. That is, as the components expand and contract, the disk 12 can move up and down.

In an exemplary aspect of the invention, the various parts of the tray 10 are cut to shape using a laser. Thus, for example, a rail 30 and a respective wire 24 can be cut from a single plate of material. This results in a structure that is relatively strong, and eliminates any need to fasten the wires 24 to the rails 30 using other means, such as welding. Moreover, cutting the undulating shape of the wires 24 using a laser prevents the occurrence of bending stresses that may accumulate at the bends of the wires 24, which may otherwise cause the wires 24 to break.

In order to eliminate any roughness in the teeth 26 of the wires 24, the wires may be electropolished. The electropolishing deburrs and polishes the machining lines formed from the laser, reducing the number of disks 12 that have minor edge damage due to contact with a burr.

In use, and referring back to FIG. 1, a plurality of trays 10 are attached to the upright panel 14, which is then lowered into the salt bath 15. In particular, the panel 14 is provided with a plurality of the support members 22 arranged to project out from a surface of the panel 14. The tray 10 is adapted, by way of the notches 20, to slide and rest on two adjacent ones of the support members 22.

In the exemplary illustrated aspect of the invention, the panel 14 is adapted to accommodate an array of 8 columns by 10 rows of trays 10. Moreover, a like number of trays 10 can be accommodated on an opposite side of the panel 14. Thus, in a relatively small volume of space, for example, 40 cubic feet, and with a tray adapted to accommodate 75 glass disks having an exemplary diameter of 95 millimeters, a fully loaded panel can treat up to 12,000 glass disks simultaneously.

Due to the configuration of the trays 10, the locating of the disks 12 into the tray 10, and the sliding of the trays 10 onto the panel 14, the chemical strengthening process, the placement of the disks into the tray, and the removing of the disks from the tray can be performed automatically.

It should be understood, however, that the invention is not necessarily limited to the specific arrangement and components shown and described above, but may be susceptible to numerous variations within the scope of the invention. For example, although the above-described exemplary aspects of the invention are believed to be particularly well suited for transporting glass disks, it is contemplated that the concepts of the present invention can be applied in other applications. For example, the concepts of the present application can be utilized whenever it is desired to store or transport various work pieces, whatever they may be, without damage being caused thereto by the tray. Moreover, it is also contemplated that the present invention may be utilized to transport or store glass disks or other work pieces through other processes, in addition to the above-described chemical strengthening process.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. A tray, comprising:
   at least three spaced apart wires, each being formed to have a dual-sided sawtooth configuration comprised of a plurality of teeth and being adapted to receive and support a disk at an outer peripheral edge therof;
   at least one longitudinally extending rod; and
   at least one support plate directly attached to said rod, said wires being connected to said rod by way of said support plate;
   wherein said wires are arranged about an outer circumference of an imaginary circle, a first one of said wires being disposed to contact an outer periphery of the imaginary circle at a position of zero degrees, a second one of said wires being disposed to contact the outer periphery of the imaginary circle at a position less than 90 degrees, and a third one of said wires being disposed to contact the outer periphery of the imaginary circle at a position greater than 270 degrees.

2. The tray recited in claim 1, wherein said wires are adapted to support the disk in an essentially upright position.

3. The tray recited in claim 2, wherein the first one of said wires is adapted to contact a lowermost portion of the outer peripheral edge of the disk, and the second and third wires are offset to either side of the first wire so as to be adapted to contact intermediate portions of the outer peripheral edge of the disk.

4. The tray recited in claim 1, wherein said second one of said wires is disposed to contact the outer periphery of the imaginary circle at a position between about 70 degrees and about 80 degrees, and said third one of said wires is disposed to contact the outer periphery of the imaginary circle at a position between about 280 degrees and about 290 degrees.

5. The tray recited in claim 1, wherein each said plurality of teeth of a respective wire is separated from an adjacent one of said teeth of the respective wire by a valley adapted to accommodate the outer peripheral edge of the disk.

6. The tray recited in claim 5, wherein the teeth of one of said wires are in alignment with the teeth of the other said wires.

7. The tray recited in claim 6, wherein each valley has a V-shaped configuration.

8. The tray recited in claim 1, further comprising at least three longitudinally extending rails attached to said support plate, each said wire being attached to a respective one of said rails so that each said wire is connected to said support plate by way of the respective one of said rails.

9. The tray recited in claim 8, wherein each said wire is spaced apart from the respective one of said rails.

10. The tray recited in claim 9, wherein each said wire and the respective one of said rails are formed from a single piece of material.

11. The tray recited in claim 9, wherein each said wire and the respective one of said rails are laser cut from a single piece of titanium.

12. The tray recited in claim 1, wherein said support plate has one of a notch and a hole formed therein for slidably receiving a support rod for supporting the tray.

13. The tray recited in claim 1, wherein said at least one support plat comprises a plurality of spaced apart support plates.

14. The tray recited in claim 13, wherein said at least one rod comprises at least two spaced apart, paralled solid rods, each being connected to said plurality of support plates.

15. The tray recited in claim 14, wherein said rods, said support plates and said wires are comprised of titanium.

16. The tray recited in claim 1, wherein said wires are comprised of titanium.

17. The tray recited in claim 1, wherein each of said plurality of teeth is separated from an adjacent one of said teeth of the respective wire by a valley adapted to accommodate the outer peripheral edge of the disk.

18. The tray recited in claim 17, wherein a pitch between adjacent teeth is about a quarter of an inch.

19. The tray recited in claim 17, wherein each said wire is formed to have an integer multiple of 25 valleys.

20. The tray recited in claim 19, wherein said at least one rod comprises first and second longitudinally extending, spaced apart, parallel rods; and said at least one support plate comprises a plurality of support plates directly attached to said rods, said wires being attached to said rods by way of said support plates, each support plat being separated from an adjacent support plate by 25 valleys.

21. The tray recited in claim 17, wherein each valley has a radius of curvature of between about 0.17 millimeters and about 0.20 millimeters.

22. The tray recited in claim 1, wherein each said wire has a thickness between about 0.5 millimeters and about 1.5 millimeters.

23. The tray recited in claim 1, wherein the zigzag configuration of each of said wires forms a plurality of teeth that lie in a plane that extends through a center of the imaginary circle.

24. A tray arrangement, comprising:
   a disk; and
   a disk-supporting member having at least three spaced apart wires adapted to receive and support the disk at an outer peripheral edge thereof, the three spaced apart wires being arranged about an outer circumference of said disk, a first one of said wires being disposed to contact the outer peripheral edge of said disk at a position of zero degrees, a second one of said wires being disposed to contact the outer peripheral edge of said disk at a position less than 90 degrees, and a third one of said wires being disposed to contact the outer peripheral edge of said disk at a position greater that 270 degrees;
   each of said wires being formed to have a dual-sided sawtooth configuration comprised of a plurality of teeth and being adapted to receive and support said disk at the outer peripheral edge thereof.

25. The tray arrangement recited in claim 24, wherein said disk is comprised of glass, and said disk-supporting member is comprised of titanium.

26. The tray arrangement recited in claim 25, wherein the glass is a sodium lithium glass.

27. The tray arrangement recited in claim 24, wherein said second one of said wires is disposed to contact the outer peripheral edge of said disk at a position between about 70 degrees and about 80 degrees, and said third one of said wires is disposed to contact the outer peripheral edge of said disk at a position between about 280 degrees and about 290 degrees.

28. The tray arrangement recited in claim 24, wherein the sawtooth configuration of each of said wires forms the plurality of teeth, each of said plurality of teeth of a respective wire being separated from an adjacent one of said teeth of the respective wire by a valley adapted to accommodate the outer peripheral edge of said disk.

29. The tray arrangement recited in claim 28, wherein the teeth of one of said wires are in alignment with the teeth of the other said wires.

30. The tray arrangement recited in claim 28, wherein each valley has a radius of curvature that is at least two times a thickness of said disk.

31. The tray arrangement recited in claim 30, wherein the thickness of the disk is about 0.33 millimeters, and the radius of curvature is between about 0.17 and about 0.20 millimeters.

32. The tray arrangement recited in claim 28, wherein each valley has a V-shaped configuration.

33. The tray arragnment of claim 24, wherein said disk-supporting member and said disk having similar thermal characteristics.

34. The tray arrangement recited in claim 24, wherein the zigzag configuration of each of said wires forms a plurality of teeth that lie in a plane that extends through a center of said disk.

35. An arrangement for chemically strengthening a glass disk, comprising:
   a generally up-right panel;
   a plurality of support members arranged on at least one side of said panel;
   a plurality of glass disks; and
   a tray removably supported by respective ones of said support members, said tray including:
      first and second longitudinally extending, spaced apart, parallel rods;

a plurality of support plates attached to said rods, each said support plate having at least one notch formed therein for receiving the respective support member;

a plurality of rails attached to said support plates; and at least three spaced apart wires, each being attached to a respective rail, and each being formed to have a zigzag configuration adapted to receive and support said disks at an outer periphery thereof, one of said wires being disposed to contact the outer peripheries of said disks at a position of zero degrees, another one of said wires being disposed to the outer peripheries of said disks at a position less than 90 degrees, and a further one of said wires being disposed to contact the outer peripheries of said disks at a position greater than 270 degrees.

36. The arrangement recited in claim 35, wherein said tray is comprised of titanium.

37. The arrangement recited in claim 36, wherein said glass disks are sodium lithium glass disks.

38. An arrangement for chemically strengthening a glass disk, comprising:

a generally up-right panel;

a plurality of support members arranged on at least one side of said panel;

a plurality of glass disks; and a tray removably supported by respective ones of said support members, said tray including:

a plurality of support plates, each said support plate having at least one notch formed therein for receiving the respective support member; and means, attached to said support plates, for receiving and supporting said disks at an outer periphery thereof, said means including at least one wire having a dual-sided sawtooth configuration comprised of a plurality of teeth.

* * * * *